United States Patent [19]

Nishikawa

[11] Patent Number: 4,463,625

[45] Date of Patent: Aug. 7, 1984

[54] TELESCOPIC STEERING APPARATUS FOR VEHICLES

[75] Inventor: Masumi Nishikawa, Toyoake, Japan

[73] Assignee: Aisin Seiki Kabushiki Kaisha, Kariya, Japan

[21] Appl. No.: 354,771

[22] Filed: Mar. 4, 1982

[30] Foreign Application Priority Data

Mar. 4, 1981 [JP] Japan .............................. 56-30564[U]

[51] Int. Cl.³ .......................... B62D 1/18; G05G 5/24
[52] U.S. Cl. ........................................ 74/493; 74/540; 280/775; 403/374; 411/79
[58] Field of Search .................. 74/493, 540; 280/279, 280/775; 403/374; 411/79

[56] References Cited

U.S. PATENT DOCUMENTS

| 939,457 | 11/1909 | Vernon et al. | 411/79 X |
| 3,874,701 | 4/1975 | Soong | 403/374 X |
| 4,113,395 | 9/1978 | Pawsat et al. | 403/374 X |

FOREIGN PATENT DOCUMENTS

| 613942 | 9/1926 | France | 280/279 |
| 910631 | 2/1946 | France | 411/79 |

Primary Examiner—Allan D. Herrmann
Attorney, Agent, or Firm—Oblon, Fisher, Spivak, McClelland & Maier

[57] ABSTRACT

A telescopic steering apparatus for vehicles includes a locking member movable substantially axially relative to a main shaft, a holder member disposed about the locking member and the main shaft and an operating lever. The main shaft has a tapered end portion engageable with a tapered end portion of the locking member. Both the main shaft and the locking member are provided with projecting portions on their outer peripheries which are engageable with portions of the holder member and the projecting portions of the locking member and the holder member include toothed portions which, when engaged, lock against telescoping of the steering apparatus through displacement of the main shaft.

6 Claims, 2 Drawing Figures

TELESCOPIC STEERING APPARATUS FOR VEHICLES

BACKGROUND OF THE INVENTION

1. Field of the Invention

The present invention relates to a telescopic steering apparatus, and more particularly to a telescopic steering apparatus for vehicles.

2. Description of the Prior Art

In a conventional telescopic steering apparatus for vehicles, a locking member and a holder are supported by a frictional engagement of the locking member and the holder. Therefore, when a strong axial impact force is experienced by a steering wheel, the engagement of the locking member and the holder is readily disengaged and a relative displacement occurs therebetween.

SUMMARY OF THE INVENTION

An object of the present invention is to provide an improved telescopic steering apparatus for vehicles which obviates the aforementioned drawbacks of the described conventional telescopic steering apparatus.

A further object of the present invention is to provide an improved telescopic steering apparatus for vehicles which can reliably telescope.

A still further object of this invention is to provide an improved telescopic steering apparatus for vehicles which is relatively simple and includes a minimum number of parts.

BRIEF DESCRIPTION OF THE DRAWINGS

Various other features, objects and attendant advantages of the present invention will be more fully appreciated and become better understood when considered in connection with the accompanying drawings wherein.

DETAILED DESCRIPTION OF THE PREFERRED EMBODIMENT

Figure 1:
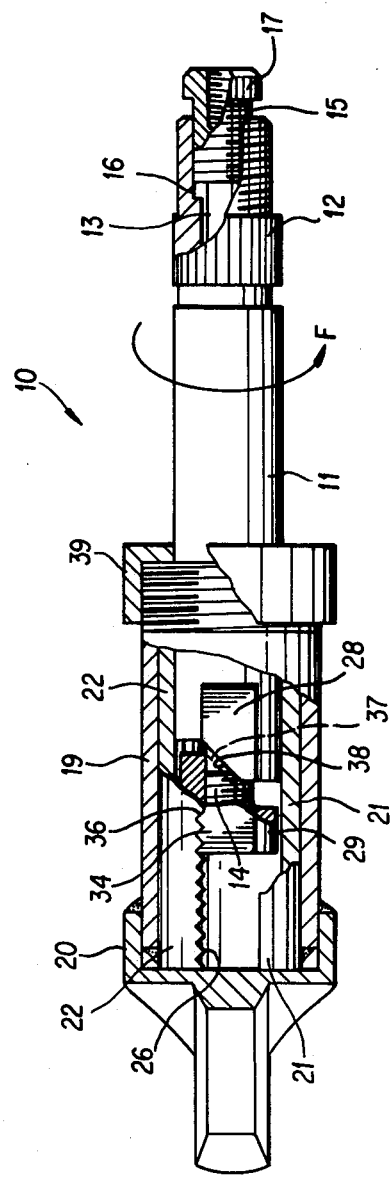
FIG. 1 is a sectional view which shows a preferred embodiment of a telescopic steering apparatus for vehicles according to the present invention.
Figure 2:
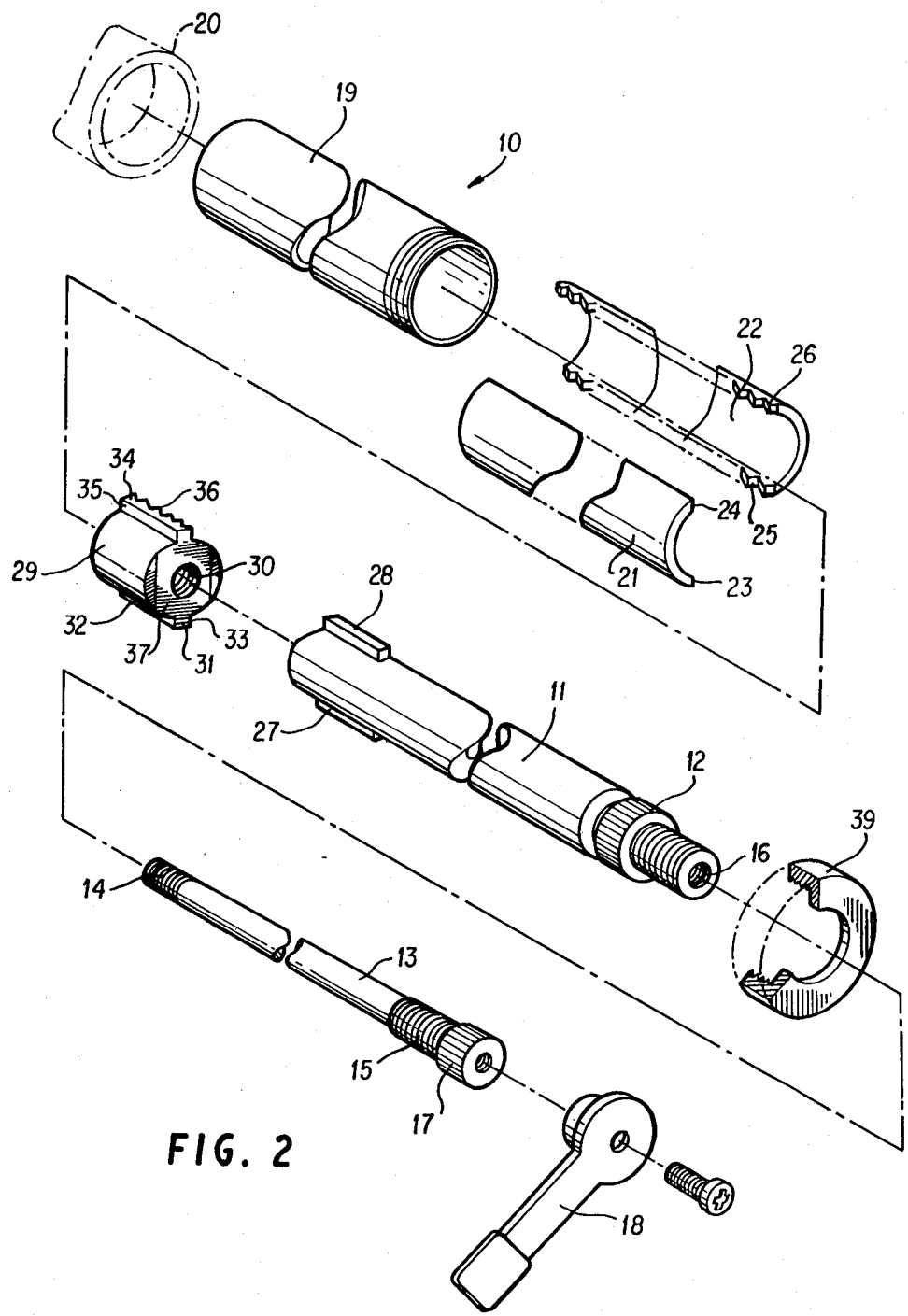
FIG. 2 is an exploded perspective view of the telescopic steering apparatus for vehicles shown in FIG. 1.

Referring now to the FIGS. 1 and 2, reference numeral 10 generally designates a telescopic steering apparatus. The telescopic steering apparatus 10 includes a main shaft 11 having a serrated portion 12 at one end to which is fixed a steering wheel (not shown). A locking rod 13 which is inserted into the main shaft 11 with a suitable clearance provided therebetween has male threads 14 (right hand threads) and 15 (left hand threads) formed on both ends thereof. The male threaded end 15 of the locking rod 13 is threadably engaged with a female threaded portion 16 (left hand threads) formed on the inner periphery of the right end of the main shaft 11. An operating lever 18 is fixed to a serrated portion 17 of the right end of the locking rod 13.

Reference numeral 19 denotes an outer cylindrical shaft having a joint 20 fixed to the outer periphery of the left end thereof. The joint 20 is operatively connected to a gear box (not shown). First and second substantially, but slightly less than semi-cylindrical shells or holders 21, 22 are fixed to an inner periphery of the outer shaft 19. The first holder 21 has elongate flat end faces 23, 24 along upper and lower portions thereof, as viewed in FIG. 2, and the second holder 22 has elongate toothed portions 25, 26 along its upper and lower portions. The main shaft 11 is slidably disposed within the first and second holders 21, 22. A projecting key-like portion 27 is provided on the outer periphery of the left end of the main shaft 11 and is located between the end face 23 of the first holder 21 and the toothed portion 25 of the second holder 22 and is engageable therewith. A projecting key-like portion 28 also provided on the outer periphery of the left end of the main shaft 11, but diametrically opposed to the projection 27, is located between the end face 24 of the first holder 21 and the toothed portion 26 of the second holder 22 and is engageable therewith.

A substantially tubular-shaped locking member 29 having female threads 30 (right hand threads) formed on the inner periphery thereof is threadably engaged with the male threads 14 of the locking rod 13, and is slidably disposed between the first and second holders 21, 22 with a suitable clearance being provided therebetween. This slidable disposition is afforded by a projecting key-like portion 31 provided on the outer periphery of the locking member 29 which is disposed between the end face 23 of the first holder 21 and the toothed portion 25 of the second holder 22. The projection 31 is provided with one side wall 32 engageable with the flat end face 23 of the first holder 21 and a toothed side wall 33 engageable with the toothed portion 25 of the second holder 22. Another projecting key-like portion 34 provided on the outer periphery of the locking member 29 diametrically opposite the projection 31 is disposed between the flat end face 24 of the first holder 21 and the toothed portion 26 of the second holder 22 and is provided with one flat side wall 35 engageable with the flat end face 24 of the first holder 21 and a toothed portion 36 engageable with the toothed portion 26 of the second holder 22. A suitable clearance is provided between locking member 29 and the first and second holders 21, 22 and between the projections 31, 34 and end faces 23, 24 of holders 21, 22 or the toothed portions 25, 26 of the holders. The purpose of such clearances will become evident. A tapered portion 37 is formed on the right end of the locking member 29 and is engageable with a tapered portion 38 formed on the left end of the main shaft 11. The reference numeral 39 designates a stopper threadably disposed on the end of the outer shaft 19.

The operation is as follows:

When the steering wheel (not shown) is rotated, the main shaft 11 is rotated through the serrated portion 12 and then the first and second holders 21, 22 are rotated by the projecting portions 27, 28. Accordingly, the outer shaft 19 and the joint 20 are also rotated, thereby transmitting a rotational force to the gear box (not shown).

When a driver desires to axially telescope the steering wheel (not shown), the operating lever 18 is rotated and the locking rod 13 is thus rotated within the shaft 11 in the direction indicated by the arrow F. Therefore, the locking member 29 is moved in the direction departing from the main shaft 11 through the male threads 14 of the locking rod 13 and the female threads 30 of the locking member 29, since rotation of member 29 is prevented by the engagement of projections 31, 34 with the holders 21, 22 secured to the outer shaft 19. Thus, the tapered portion 37 of the locking member 29 moves away from the tapered portion 38 of the main shaft 11 and, because of the clearances provided, the side walls 32, 35 of the projecting portion 31, 34 of the locking member 29 are engaged with end faces 23, 24 of the first holder 21 and toothed portions 33, 36 of the projecting portions 31, 34 are released from the toothed portions 25, 26 of the second holder 22. Therefore, the steering wheel (not shown) can be axially telescoped until a desired position of the steering wheel is obtained.

When the operating lever 18 is rotated in the opposite direction in the abovementioned direction, the locking rod 13 is rotated and the locking member 29 is moved axially in the direction of the main shaft 11 through the male screw 14 of the locking rod 13 and the female screw 30 of the locking member 29. Namely, the tapered portion 37 of the locking member 29 becomes engaged with the tapered portion 38 of the main shaft, so that the side walls 32, 35 of the projecting portions 31, 34 of the locking member 29 are disengaged from the end faces 23, 24 of the first holder 21, according to the clearances provided, and the toothed portions 33, 36 of the projecting portions 31, 34 are engaged with the toothed portions 25, 26 of the second holder 22. Accordingly, the steering wheel is again locked at an axially desired position.

By the foregoing, there has been disclosed a preferred form of tiltable steering apparatus for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A telescopic steering apparatus for vehicles, comprising:
    a main shaft having a tapered end portion and a projecting portion on an outer periphery thereof;
    a locking rod inserted through said main shaft;
    a locking member movable substantially axially according to the rotation of said locking rod relative to said main shaft and provided with a tapered end portion engageable with said tapered end portion of said main shaft and a projecting portion on the outer periphery thereof, said projecting portion having a toothed face;
    a holder member provided with a toothed portion engageable with said toothed face of said locking member;
    an outer shaft integrally receiving said holder member therein; and
    an operating lever for releasing the engagement of said tapered portions of said main shaft and said locking member, and the engagement of said toothed face of said locking member and said toothed portion of said holder.

2. A telescopic steering apparatus for vehicles as set forth in claim 1, wherein said operating lever is fixed to said locking rod.

3. A telescopic steering apparatus for vehicles as set forth in claim 1, wherein said locking rod is threadably engaged at one end thereof with one end of said main shaft.

4. A telescopic stearing apparatus for vehicles as set forth in claim 1, wherein said holder member is fixed to an inner periphery of said outer shaft and includes first and second holders.

5. A telescopic steering apparatus for vehicles as set forth in claim 4, wherein said main shaft is axially slidably disposed within said first and second holders.

6. A telescopic steering apparatus for vehicles as set forth in claim 4, wherein said locking member is slidably disposed within said first and second holders.

* * * * *